(12) United States Patent
Yoshida

(10) Patent No.: US 6,178,005 B1
(45) Date of Patent: Jan. 23, 2001

(54) IMAGE PROCESSING APPARATUS THAT CONTROLS A BLANK TO BE A PREDETERMINED LENGTH IN ACCORDANCE WITH THE SIZE OF THE RECORDING MEDIUM

(75) Inventor: Takehiro Yoshida, Tokyo (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/017,292

(22) Filed: Feb. 2, 1998

Related U.S. Application Data

(62) Division of application No. 08/401,998, filed on Mar. 10, 1995, now Pat. No. 5,734,760.

(30) Foreign Application Priority Data

Mar. 24, 1994 (JP) ......................................... 6-78004

(51) Int. Cl.⁷ .................................................. H04N 1/387
(52) U.S. Cl. ........................................... 358/1.18; 358/449
(58) Field of Search ...................... 358/1.9, 1.18, 358/449, 450, 452, 453, 401; 382/284, 286

(56) References Cited

U.S. PATENT DOCUMENTS

| | | | |
|---|---|---|---|
| 4,631,596 | * 12/1986 | Yaguchi | 358/449 |
| 5,052,834 | 10/1991 | Feistel et al. | |
| 5,177,548 | 1/1993 | Nakamura et al. | |
| 5,589,948 | * 12/1996 | Itezono | 358/449 |
| 5,602,651 | * 2/1997 | Tabata et al. | 358/448 |

* cited by examiner

*Primary Examiner*—Scott Rogers
(74) *Attorney, Agent, or Firm*—Fitzpatrick, Cella, Harper & Scinto

(57) ABSTRACT

A blank space is provided at an appropriate position on a recording paper as determined by either input image data to be recorded, or the size of the recording paper.

5 Claims, 12 Drawing Sheets

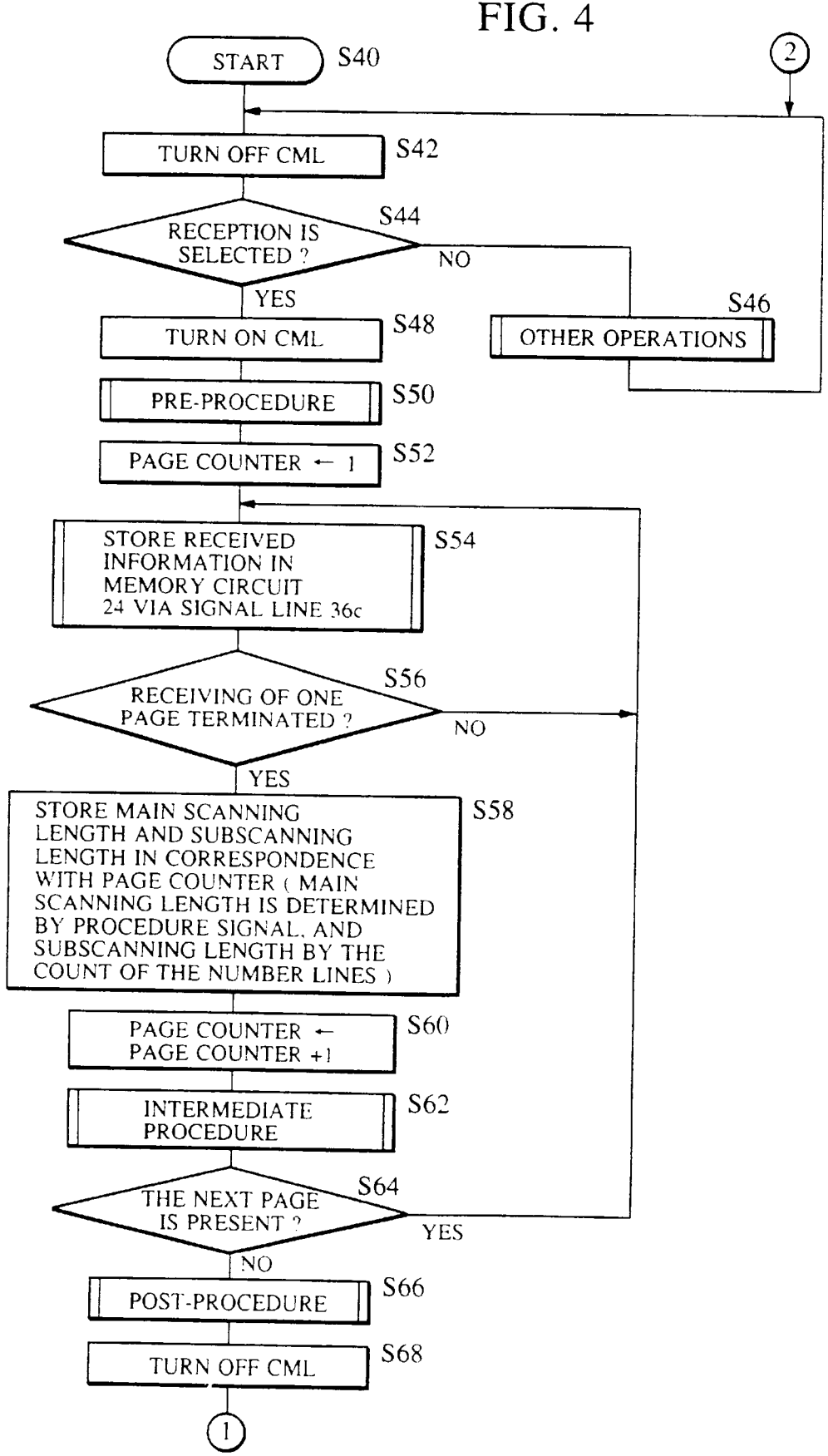

IMAGE PROCESSING APPARATUS THAT CONTROLS A BLANK TO BE A PREDETERMINED LENGTH IN ACCORDANCE WITH THE SIZE OF THE RECORDING MEDIUM

This application is a divisional of prior application Ser. No. 08/401,998 filed Mar. 10, 1995 now U.S. Pat. No. 5,734,760.

BACKGROUND OF THE INVENTION

1. Field of the Invention

The present invention relates to an image processing apparatus capable of recording input image data on recording paper.

2. Description of the Related Art

An image processing apparatus is known, which is capable of providing a blank space for filing purposes when received image information, image information read by a reading apparatus or the like is recorded on recording paper. However, in such an image processing apparatus, although the operator is able to select the position of the blank space for filing purposes, once the selection is made, the position of the blank space is fixed unless changed by the operator.

For this reason, if, for example, the operator selects the left side of the recording paper as the position of the blank space for filing purposes, the blank space for filing purposes is always provided at the left side of the recording paper when image information shown in FIGS. 2A, 2B and 2C and FIGS. 3A and 3B is recorded.

In a case where, for example, the portrait orientation of the image information with the long side of a manuscript of A4 size (210 mm×297 mm) input as data along the main scanning direction is converted to the landscape orientation (rotated 90° to the right), as shown in FIG. 2B and recorded, if the blank space for filing purposes is located on the right side of the recording paper, filing would be easier. However, in the above example, the blank space is provided on the left side as shown in FIG. 2B.

In contrast with the case of FIG. 2B, in a case where the landscape orientation of image information with the short side input as data along the main scanning direction is converted to the portrait orientation and recorded, if the blank space for filing purposes is located on the top side of the recording paper, filing would be easier. However, in this example, the blank space is provided on the left side, as shown in FIG. 2C.

When two pages of image information are recorded on one page of recording paper as shown in FIG. 3A, for example, when two pages of an A4 size manuscript are recorded on A3 size (297 mm×420 mm) recording paper, if the blank space for filing purposes is located on the top side (short side) of the recording paper, filing would be easier, and when two pages of an A4 size manuscript are reduced and recorded on A4 size recording paper, if the blank space for filing purposes is located on the right side of the recording paper, filing would be easier. However, as shown in FIG. 3A, in both cases the blank space is provided on the left side.

Also, when, for example, two pages of image information with the long side of the A4 size manuscript input as data along the main scanning direction are recorded on one page of A3 size recording paper, if the blank space for filing purposes is located on the top side of the recording paper, filing would be easier. However, in this case, the blank space is provided on the left side, as shown in FIG. 3B.

As described above, in the prior art it is not possible to provide a blank space for filing purposes at an appropriate position when input image information is recorded on recording paper. Also, it is not possible to unify the length of the blank space in order to make filing easier.

SUMMARY OF THE INVENTION

It is an object of the present invention to solve the above-described problems of the prior art.

It is another object of the present invention to provide an image processing apparatus having improved ease of operation.

It is yet another object of the present invention to provide an image processing apparatus capable of providing a blank space for filing purposes at an appropriate position on the recording paper.

It is a further object of the present invention to provide an image processing apparatus capable of providing an appropriate blank space for filing purposes in response to image information to be recorded.

It is a still further object of the present invention to provide an image processing apparatus capable of providing an appropriate blank space for filing purposes in accordance with recording paper on which image information is recorded.

To achieve the above-described objects, according to one aspect of the present invention, there is provided an image processing apparatus, comprising: input means for inputting image data; setting means for setting a blank space; and recording means for recording image information input by the input means on recording paper with a blank space being provided as set by the setting means, wherein the setting means changes the position of a blank space to be set in accordance with image data input by the input means.

According to another aspect of the present invention, there is provided an image processing method, comprising the steps of: inputting image data; setting a blank space; and recording the image data input in the inputting step on recording paper with a blank space being provided as set in the setting step, wherein in the setting step the position of a blank space to be set is changed in accordance with image data input in the inputting step.

The above and further objects, aspects and novel features of the invention will more fully appear from the following detailed description when read in conjunction with the accompanying drawings.

BRIEF DESCRIPTION OF THE DRAWING

FIGS. 4 to 12 are flowcharts illustrating the sequence of the operation of the image processing apparatus in accordance with the embodiment of the present invention.

DESCRIPTION OF THE PREFERRED EMBODIMENTS

Preferred embodiments of the present invention will be described below in detail with reference to the accompanying drawings.

The instruction of whether or not a blank space should be provided is given by an operator. In this embodiment, it is assumed that a blank space will be so provided.

Figure 1:
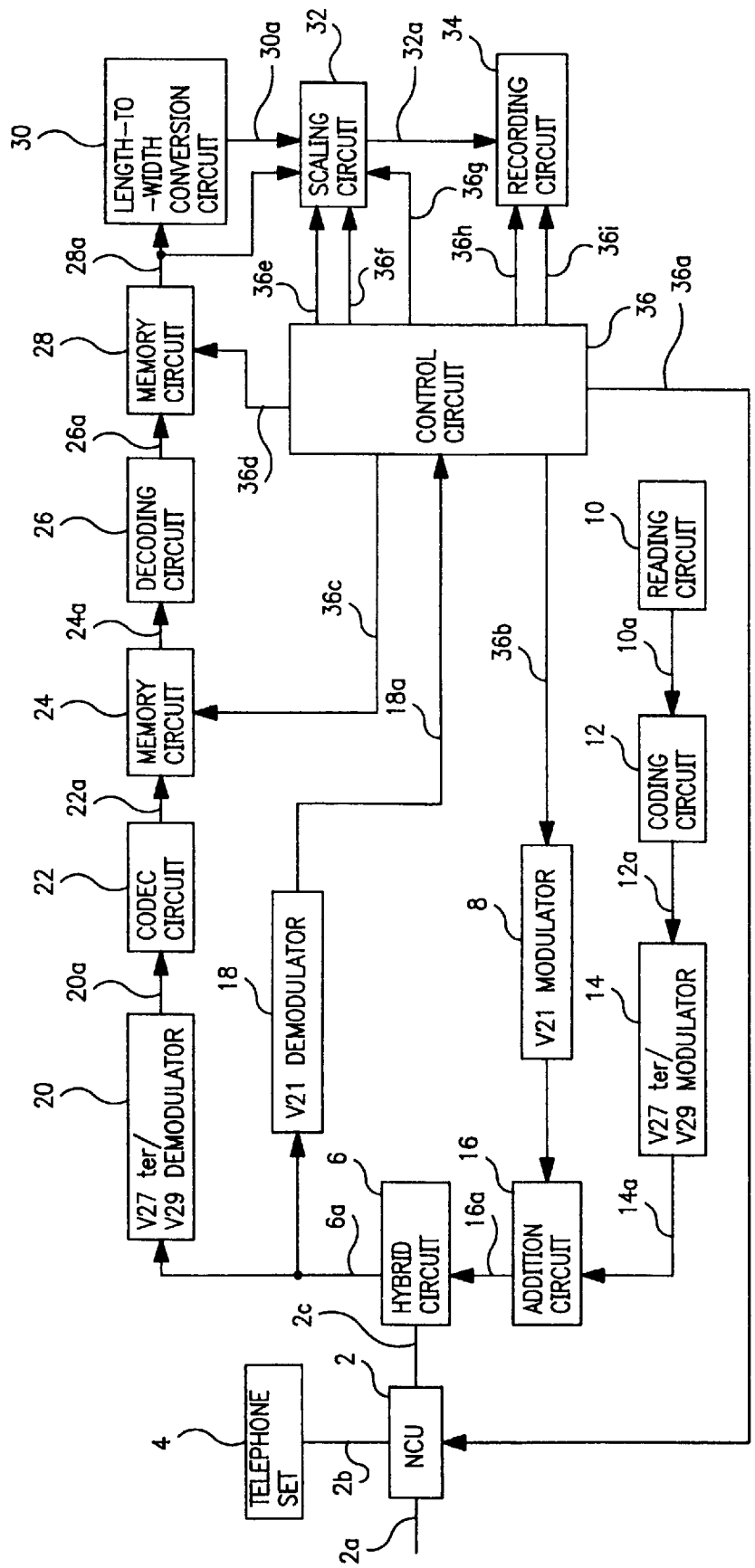
FIG. 1 is a block diagram illustrating the construction of a facsimile apparatus serving as an image processing apparatus in accordance with one embodiment of the present invention.

Referring to FIG. 1, reference numeral 2 denotes a network control unit (NCU) which is connected to a terminal of a communications line in order for the telephone network to be used for data communications or the like, which unit switches to a data communication channel and maintains a loop. The NCU 2 connects a telephone line 2a to a telephone set 4 side (2b) when the signal level of a signal line 36a from a control circuit 36 is "0" and connects the telephone line 2a to a facsimile apparatus side (2c) when the signal level is "1". In the normal state, the telephone line 2a is connected to the telephone set 4.

A hybrid circuit 6 separates signals of a transmission system from signals from a reception system, transmits transmission signals from an addition circuit 16 to the telephone line 2a via the NCU 2, receives signals from another party via the NCU 2, and sends the signals to a V27ter/V29 demodulator 20 and a V21 demodulator 18.

The V21 modulator 8 is a modulator for performing modulation based on known ITU-T (International Telecommunication Union) recommendations V21, which modulates procedure signals from the control circuit 36 through a signal line 36b and sends out the signals to the addition circuit 16 through a signal line 8a.

A reading circuit 10, formed of imaging elements, such as CCDs (Charge Coupled Devices) and an optical system, sequentially reads image signals for one line along the main scanning direction from a manuscript to be transmitted, creates signal sequences representing binary values of black and white, and sends this data from a signal line 10a to a coding circuit 12.

The coding circuit 12 inputs read data which is output to the signal line 10a, performs coding (MH coding or MR coding), and outputs the coded data to a signal line 12a.

The V27ter/V29 modulator 14 inputs coded data from the signal line 12a, performs modulation based on known ITU-T recommendations V27ter (differential phase modulation) or V29 (orthogonal modulation), and outputs this modulated data to the addition circuit 16 through a signal line 14a.

The addition circuit 16 is a circuit which adds the outputs of the modulators 8 and 14. The output from the addition circuit 16 is sent to the hybrid circuit 6.

The V21 demodulator 18 is designed to perform demodulation based on known ITU-T recommendations V21. The demodulator 18 inputs procedure signals from the hybrid circuit 6 through a signal line 6a, performs V21 demodulation, and sends the demodulated data to the control circuit 36 through a signal line 18a.

The V27ter/V29 demodulator 20 is designed to perform demodulation based on known ITU-T recommendations V27ter or V29. The demodulator 20 inputs modulated image signals from the hybrid circuit 6, demodulates the signals and sends out the signals to a codec (coding/decoding) circuit 22 through a signal line 20a.

The codec circuit 22 inputs demodulated data which is output to the signal line 20a, and demodulates the data once, after which MR coding of K=8 is performed again, and outputs coded data to a memory circuit 24 through a signal line 22a.

The memory circuit 24 stores the coded data which is output to the signal line 22a under the control of a signal line 36c from the control circuit 36, and also sends out this stored coded data to a decoding circuit 26 through a signal line 24a.

The decoding circuit 26 is a circuit which inputs coded data from the signal line 24a and performs MR decoding of the data, and outputs the decoded data to a memory circuit 28 through a signal line 26a.

The memory circuit 28 stores the decoded data which is output to the signal line 26a under the control of a signal line 36d from the control circuit 36, and also sends out this stored decoded data through a signal line 28a to a length-to-width conversion circuit 30 and a scaling circuit 32.

The length-to-width conversion circuit 30 inputs data on the signal line 28a and outputs information which is subjected to length-to-width conversion, i.e., rotated 90° to the right, to the scaling circuit 32 through a signal line 30a.

The scaling circuit 32 is a circuit which enlarges or reduces an image in accordance with an instruction from the operator or the size of the recording paper, and scales image information up or down so that the image will not be lost when a blank space is provided and the image is recorded.

The scaling circuit 32 inputs information on line 28a when a level "0" signal is input on a signal line 36e, inputs information which is on the signal line 30a when a level "1" signal is input on the signal line 36e, scales for the main scanning direction by a scaling factor input on line 36g and scales for the subscanning direction by a scaling factor input on a signal line 36f, and outputs the scaled data to the recording circuit 34 through a signal line 32a.

The recording circuit 34 sets a blank space at a positioned specified by a signal line 36i, the length of the blank space being the length (in units of mm) output to a signal line 36h, and records an image at an area other than the blank space area. The recording circuit 34 inputs information in sequence from the signal line 32a and performs recording in sequence for each line.

When a signal "0" is input on the signal line 36i, a blank space is provided on the left side of the recording paper; when a signal "1" is input on the signal line 36i, a blank space is provided on the right side of the recording paper; when a signal "2" is input on the signal line 36i, a blank space is provided on the top side of the recording paper; when a signal "3" is input on the signal line 36i, a blank space is provided on the bottom side of the recording paper; when a signal "4" is input on the signal line 36i, a blank space is provided on the top and bottom sides of the recording paper; and when a signal "5" is input on the signal line 36i, no blank space is provided on the recording paper.

In the recording circuit 34, when a blank space is provided on the left or right side of the recording paper, i.e., along the direction at right angles to the line along the main scanning direction, the timing of the transport of the recording paper is the same as in the normal time. Only when a blank space is provided on the left side is recording performed by shifting the position at which the recording starts by the amount of the width of the blank space to be provided for each line, and thus a desired blank space is provided. When a blank space is provided on the right side, the image is scaled by the scaling circuit 32 by the amount of the width of the blank space, and recording starts as in the normal time.

In the recording circuit 34, when a blank space is provided on the top or bottom side of the recording paper, i.e., along the direction at right angles to the subscanning direction, the timing of the transport of the recording paper is changed from that at the normal time. That is, when a blank space is provided on the top side, the transport of the recording paper is started earlier than the normal time by the amount of the width of the blank space to be provided, and a blank space is provided for the desired width, after which the recording of the image information is started. When a blank space is to be provided on the bottom side, since the image is scaled by the scaling circuit 32 by the amount of the width of the blank space, the transport and recording of the recording paper is started at the normal timing.

The control circuit 36 controls each section of the apparatus. The control circuit 36 incorporates a ROM (not shown) and a RAM (not shown). Programs by which the apparatus is made to perform predetermined operations and predetermined data are stored in the ROM. The control circuit 36 controls each section of the apparatus in accordance with the programs stored in the ROM. The RAM is a memory used as a work area for the control circuit 36, and is capable of temporarily storing various data.

First Embodiment

FIGS. 4 to 7 are flowcharts illustrating the operation of the control circuit 36 in accordance with a first embodiment of the present invention. In the first embodiment, it is assumed that the image information is to be recorded on A4 size recording paper which is set vertically (the short side being along the main scanning direction).

Initially, in step S42, a level "0" signal is output to the signal line 36*a* in order to turn off CML. In step S44, a check is made to determine if reception of facsimile data has been selected. If reception of facsimile data has been selected, the process proceeds to step S48; if not, the process proceeds to step S46 where other operations are performed.

In step S48, a level "1" signal is output to the signal line 36*a* in order to turn on CML. In step S50, a pre-procedure in the facsimile communication is performed. In step S52, the page counter in the RAM, a work area, is set at "1", and in step S54, the received image information is stored in the memory circuit 24 through the signal line 36*c*.

Next, in step S56, a check is made to determine if reception for one page has terminated. When the reception for one page has terminated, the process proceeds to step S58. When the reception for one page has not terminated, the process returns to step S54 where the reception is continued.

In step S58, the main scanning length and the subscanning length of the received image information are stored in the RAM. At this point, the main scanning length is informed by the procedure signal of the pre-procedure, and the subscanning length is determined by the count of the number of lines and the line density.

Next, in step S60, the value of the page counter is increased by 1, and in step S62, the intermediate procedure in the facsimile communication is performed. In step S64, a check is made to determine if the next page is present. If the next page is present, the process returns to step S54 where the operation for receiving the next page is repeatedly performed. If the next page is not present, the process proceeds to step S66 where a post-procedure in the facsimile communication is performed.

Next, in step S68, a level "0" signal is output to the signal line 36*a* in order to turn off CML. In step S70, a check is made to determine if the size and orientation of all the received image information is A4 size (210 mm×297 mm) and portrait, respectively. If all the image information is at A4 size portrait orientation, the process proceeds to step S72, and if not, the process proceeds to step S82.

In step S72, a signal "200/216" is output to the signal line 36*g*, and a signal "1" is output to the signal line 36*f*, causing the scaling circuit 32 to be set so that the scale is "200/216" times for the main scanning direction and one time as great for the subscanning direction. In step S74, a signal "0" is output to the signal line 36*e*, and the scaling circuit 32 is set to input signals from the signal line 28*a*.

Figure 2A:
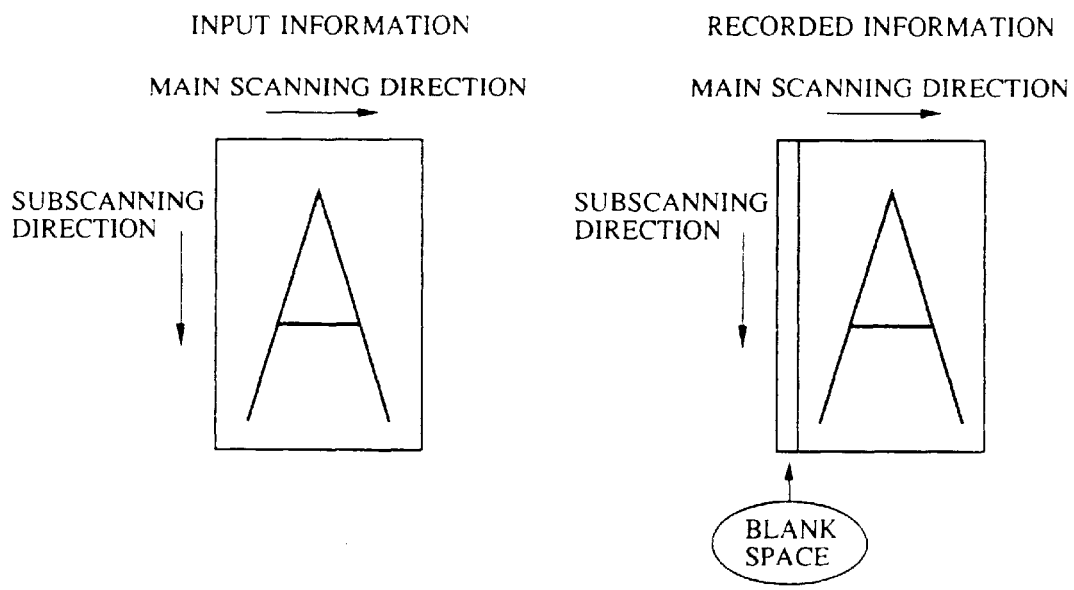
FIGS. 2A to 2C and FIGS. 3A to 3B show input image information and recorded image information when a blank space is provided according to the prior art.

In step S76, a signal "10 mm" is output to the signal line 36*h* and a signal "0" is output to the signal line 36*i* so as to provide a blank space of 1 cm on the left side of the recording paper. In step S78, the image information received by the memory circuit 24 via the signal lines 36*c* and 36*d* is recorded on the recording paper without length-to-width conversion via the memory circuit 28 with a blank space of 1 cm being provided on the left side of the recording paper, as shown in FIG. 2A.

Next, in step S80, a check is made to determine if recording for all the pages has completely terminated. If recording for all the pages has completely terminated, the process returns to step S42, and the process terminates. If recording for all the pages has not completely terminated, the process returns to step S78 where the next page is recorded.

In step S82, a check is made to determine if the size and orientation of all the received image information is A5 size (210 mm×148 mm) and landscape, respectively. If all the received image information is at A5 size landscape orientation, the process proceeds to step S84, and if not, the process proceeds to step S104.

In step S84, a signal "200/216" is output to the signal line 36*g*, and a signal "1" is output to the signal line 36*f*, causing the scaling circuit 32 to be set so that the scale is "200/216" times for the main scanning direction and one time as great for the subscanning direction. In step S86, a signal "0" is output to the signal line 36*e*, and the scaling circuit 32 is set to input signals from the signal line 28*a*.

In step S88, a signal "10 mm" is output to the signal line 36*h* and a signal "0" is output to the signal line 36*i* so as to provide a blank space of 1 cm on the left side of the recording paper. In step S90, the image information received by the memory circuit 24 via the signal lines 36*c* and 36*d* is recorded on the recording paper without length-to-width conversion via the memory circuit 28 with a blank space of 1 cm being provided on the left side of the recording paper.

Thereafter, in step S92, a check is made to determine if recording for one page has terminated. If recording for one page has not terminated, recording is continued in step S90. When recording for one page terminates, the process proceeds to step S94 where a check is made to determine if received data to be recorded next is present in the memory circuit 24. If received data to be recorded next is present, the process proceeds to step S96. If, however, received data to be recorded next is not present, the process returns to step S42, and the process terminates.

In step S90, information for a lateral line indicating the delimiter for one page is recorded. In step S98, the image information received by the memory circuit 24 via the signal lines 36*c* and 36*d* is recorded on the recording paper without length-to-width conversion via the memory circuit 28 with a blank space of 1 cm being provided on the left side of the recording paper.

In step S100, a check is made to determine if recording for one page has terminated. If recording for one page has not terminated, the process returns to step S98, and the recording is continued. If recording for one page has terminated, the process proceeds to step S102 where a check is made to determine if received data to be recorded next is present in the memory circuit 24. If received data to be recorded next is not present in the memory circuit 24, the process returns to step S42, and the process terminates.

In step S104, a check is made to determine if the size and orientation of all the received image information is A4 size (294 mm×210 mm) and landscape, respectively. If all the received image information is at A4 size landscape orientation, the process proceeds to step S106, and if not, the process returns to step S116.

Figure 2B:
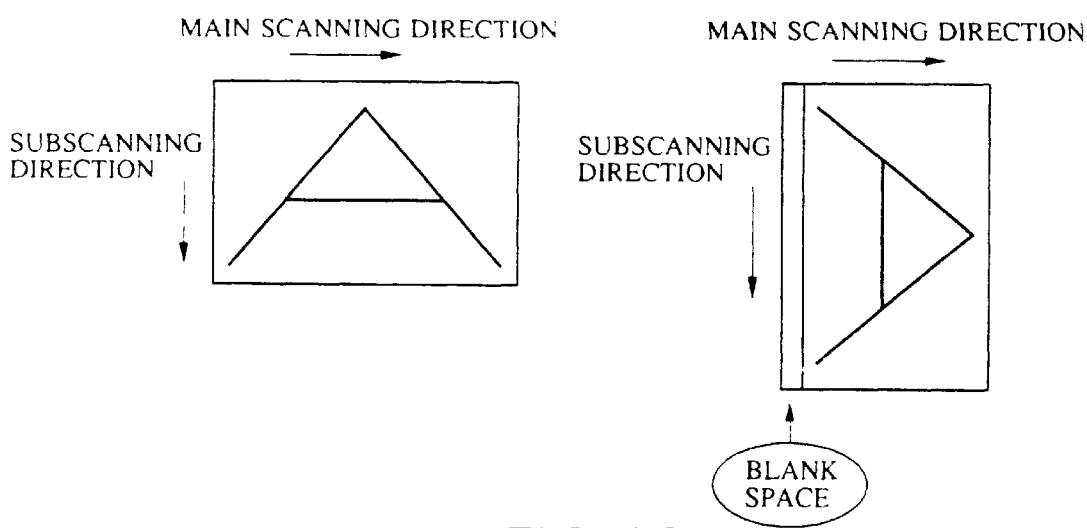
Figure 2C:
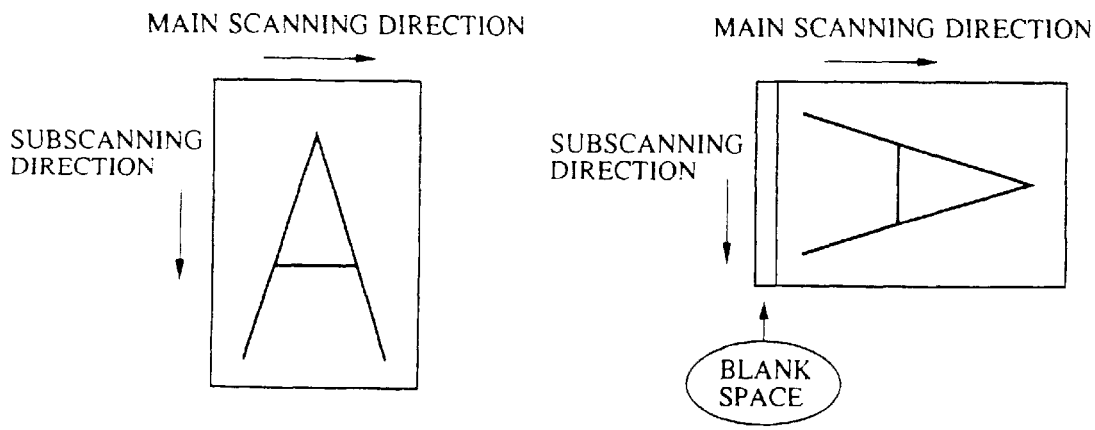

In step S106, a signal "200/216" is output to the signal line 36g, and a signal "1" is output to the signal line 36f, causing the scaling circuit 32 to be set so that the scale is "200/216" times for the main scanning direction and one time as great for the subscanning direction. Next, in step S108, a signal "1" is output to the signal line 36e, causing the scaling circuit 32 to be set to input signals from the signal line 30a. In step S110, a signal "10 mm" is output to the signal line 36h and a signal "1" is output to the signal line 36i so that the recording circuit 34 is set to provide a blank space of 1 cm on the right side of the recording paper. In step S112, the image information received by the memory circuit 24 via the signal lines 36c and 36d is length-to-width converted, as shown in FIG. 2B, via the memory circuit 28 and recorded on the recording paper with a blank space of 1 cm being provided on the right side of the recording paper. In step S114, a check is made to determine if recording for all the pages has completely terminated. If recording for all the pages has completely terminated, the process returns to step S42, and the process terminates. If, however, recording for all the pages has not completely terminated, the operation of S112 is continued.

In step S116, a check is made to determine if the size and orientation of all the received image information is A5 size (148 mm×210 mm) and portrait, respectively. If all the received image information is at A5 size portrait orientation, the process proceeds to step S118, and if not, the process proceeds to step S138.

In step S118, a signal "200/216" is output to the signal line 36g, and a signal "1" is output to the signal line 36f, causing the scaling circuit 32 to be set so that the scale is "200/216" times for the main scanning direction and one time as great for the subscanning direction. In step S120, a signal "1" is output to the signal line 36e, and the scaling circuit 32 is set to input signals from the signal line 30a.

In step S122, a signal "10 mm" is output to the signal line 36h and a signal "1" is output to the signal line 36i so as to provide a blank space of 1 cm on the right side of the recording paper. In step S124, the image information received by the memory circuit 24 via the signal lines 36c and 36d is length-to-width converted via the memory circuit 28 and recorded on the recording paper with a blank space of 1 cm being provided on the right side of the recording paper.

Next, in step S126, a check is made to determine if recording for one page has terminated. If recording for one page has terminated, the process proceeds to step S128. If recording for one page has not terminated, the recording operation of S124 is continued.

In step S128, a check is made to determine if received data to be recorded next is present in the memory circuit 24. If received data to be recorded next is present in the memory circuit 24, the process proceeds to step S130. If not, the process returns to step S42, and the process terminates.

Figure 3A:
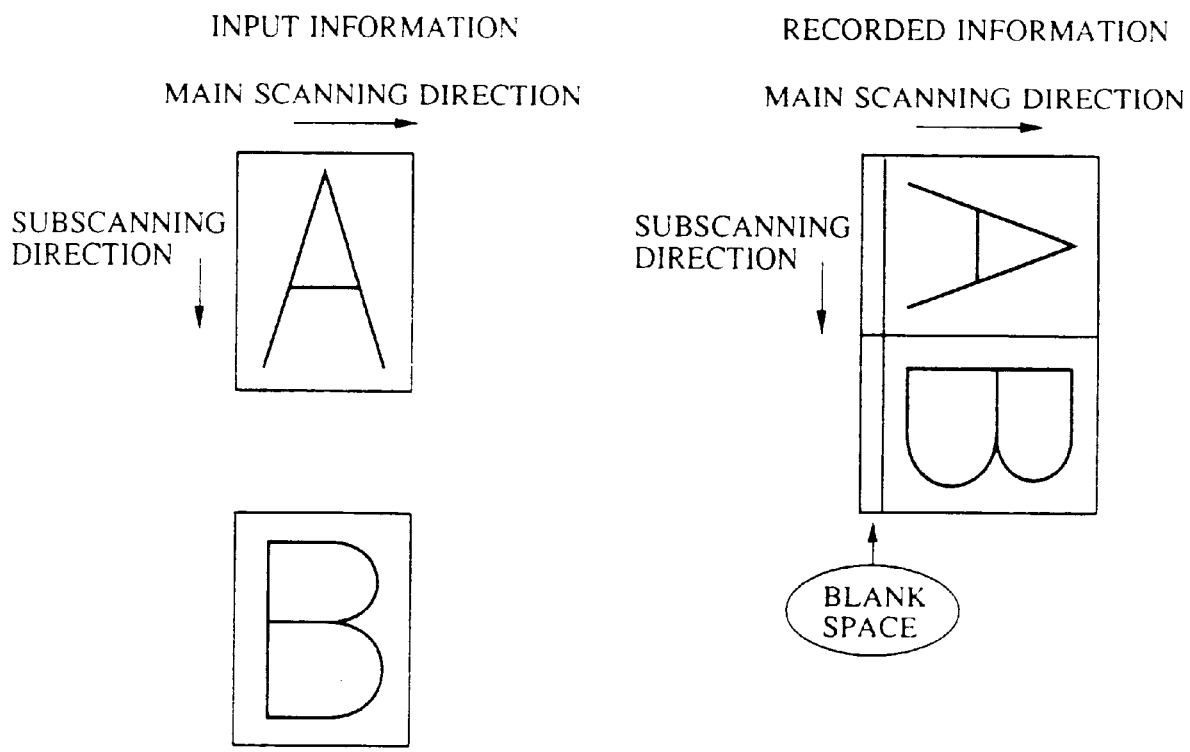
Figure 3B:
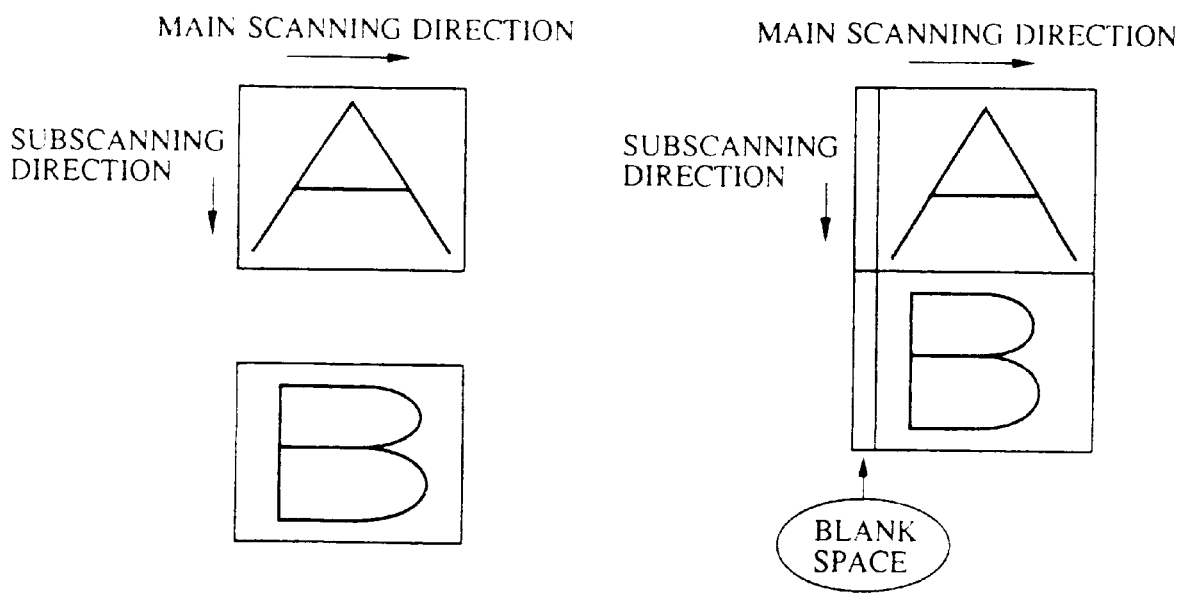
Figure 5:
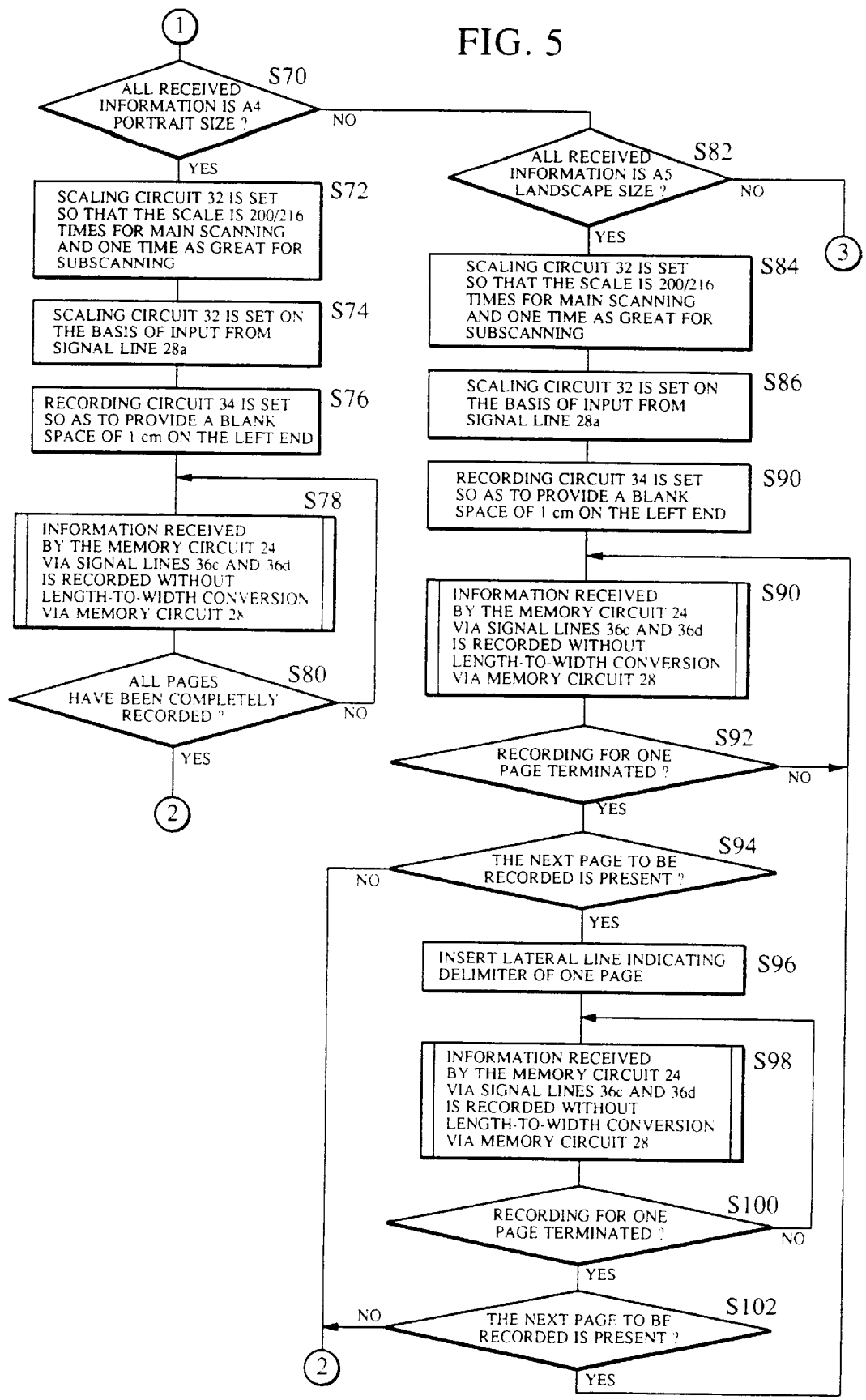
Figure 6:
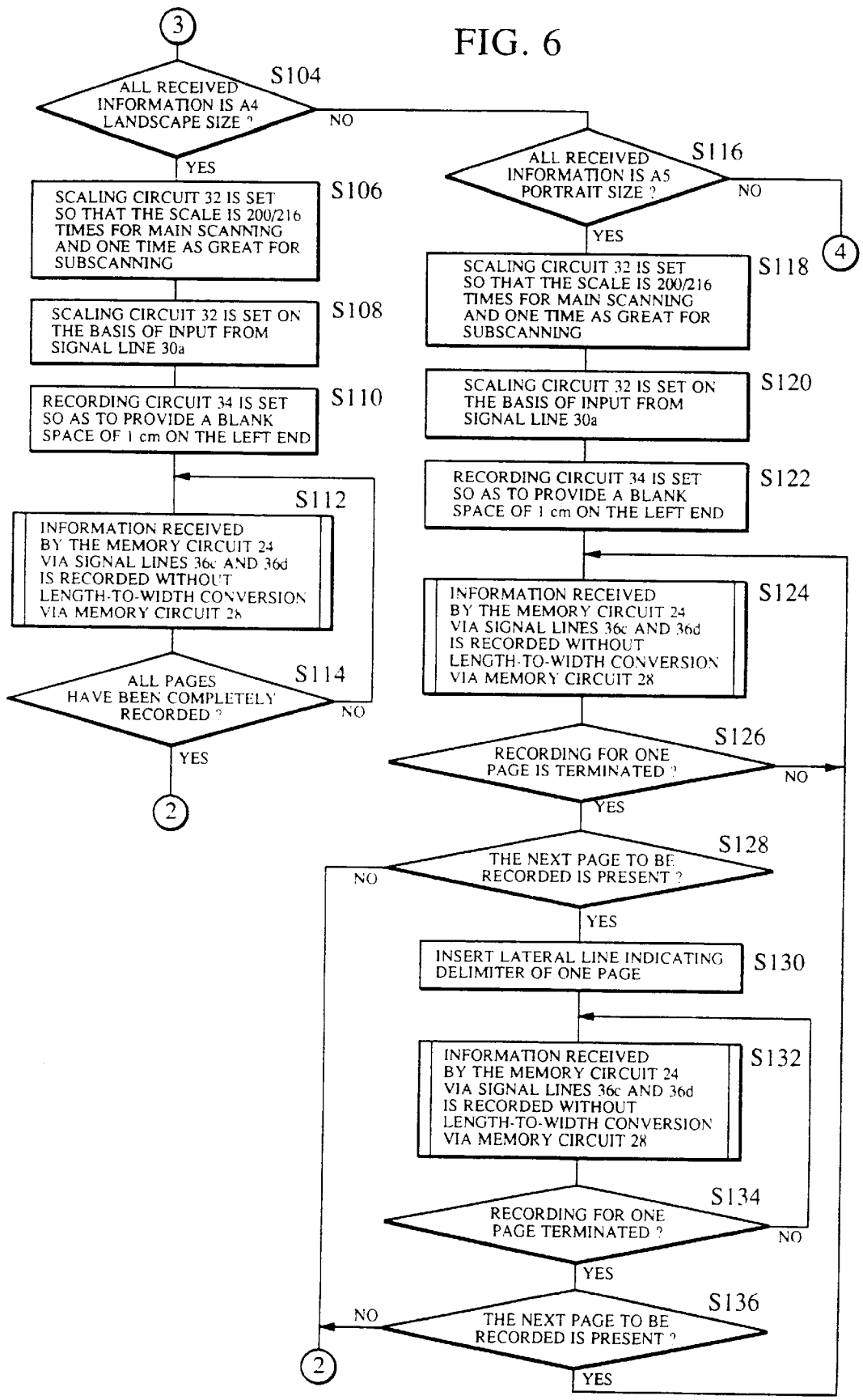
Figure 7:
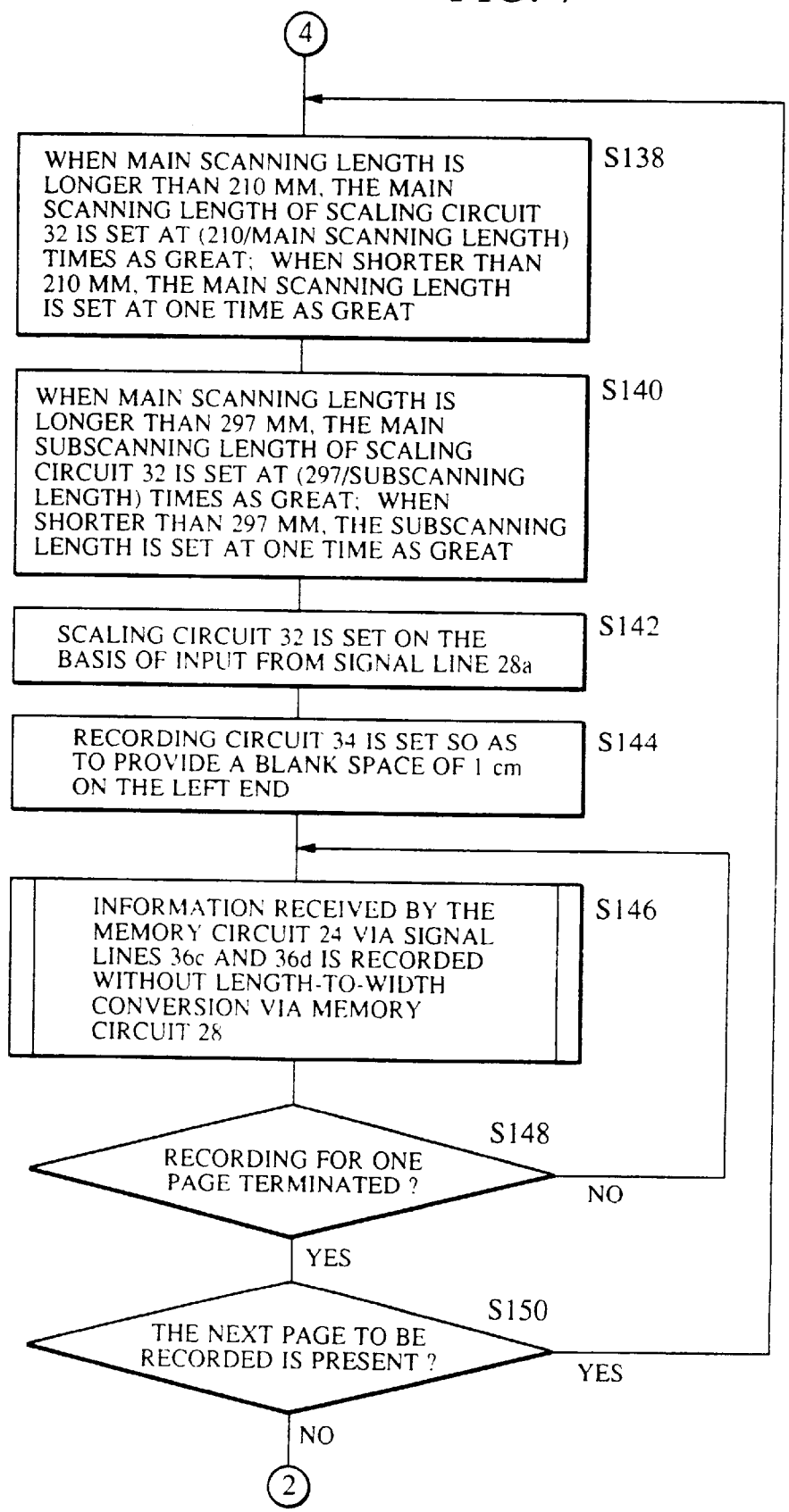

In step S130, information for a lateral line indicating the delimiter for one page is recorded. In step S132, the image information received by the memory circuit 24 via the signal lines 36c and 36d is length-to-width converted, as shown in FIG. 3A, via the memory circuit 28 and recorded on the recording paper with a blank space of 1 cm being provided on the right end of the recording paper.

In step S134, a check is made to determine if recording for one page has terminated. If recording for one page has terminated, the process proceeds to step S136. If recording for one page has not terminated, the operation of S132 is continued.

In step S136, a check is made to determine if received data to be recorded next is present in the memory circuit 24. If received data to be recorded next is present in the memory circuit 24, the process proceeds to step S124 where the received data to be recorded next is processed. If received data to be recorded next is not present in the memory circuit 24, the process returns to step S42, and the process terminates.

In step S138, when the main scanning length of the received image information is longer than 210 mm, a signal "210/main scanning length" is output to the signal line 36g, causing the scaling circuit 32 to be set so that the scale is "210/main scanning length" times for the main scanning direction. When the main scanning length of the received image information is shorter than 210 mm, a signal "1" is output to the signal line 36g, causing the scaling circuit 32 to be set so that the scale is one time as great for the main scanning direction.

Next, in step S140, when the subscanning length of the received image information is longer than 297 mm, a signal "297/subscanning length" is output to the signal line 36f, causing the scaling circuit 32 to be set so that the scale is "297/subscanning length" times for the subscanning direction. When the subscanning length is shorter than 297 mm, a signal "1" is output to the signal line 36f, causing the scaling circuit 32 to be set so that the scale is one time as great for the subscanning direction.

In step S142, a signal "0" is output to the signal line 36e so that the scaling circuit 32 is set to input signals from the signal line 28a. In step S144, a signal "10 mm" is output to the signal line 36h and a signal "0" is output to the signal line 36i so that the recording circuit 34 is set to provide a blank space of 1 cm on the left side of the recording paper.

In step S146, the image information received by the memory circuit 24 via the signal lines 36c and 36d is recorded on the recording paper without length-to-width conversion via the memory circuit 28 with a blank space of 1 cm being provided on the left side of the recording paper. Next, in step S148, a check is made to determine if recording for one page has terminated. When the recording for one page has terminated, the process proceeds to step S150. When the recording for one page has not terminated, the process returns to step S146 where the recording is continued.

In step S150, a check is made to determine if received data to be recorded next is present in the memory circuit 24. If received data to be recorded next is present in the memory circuit 24, the process proceeds to step S138 where the received data to be recorded next is processed. If received data to be recorded next is not present in the memory circuit 24, the process returns to step S42, and the process terminates.

Second Embodiment

A second embodiment of the present invention will be described below.

Although in the above-described first embodiment the data is recorded after data for one communication has been received, recording may be performed after recording information for one page has been received.

Although in the above-described first embodiment a blank space is provided on the left side of the recording paper in all the sizes when information for A5 portrait, A5 landscape, A4 portrait, and A4 landscape is received in a mixed manner, a most appropriate blank space may be provided in sequence on each individual page or on two pages as a pair, and recorded.

Figure 8:
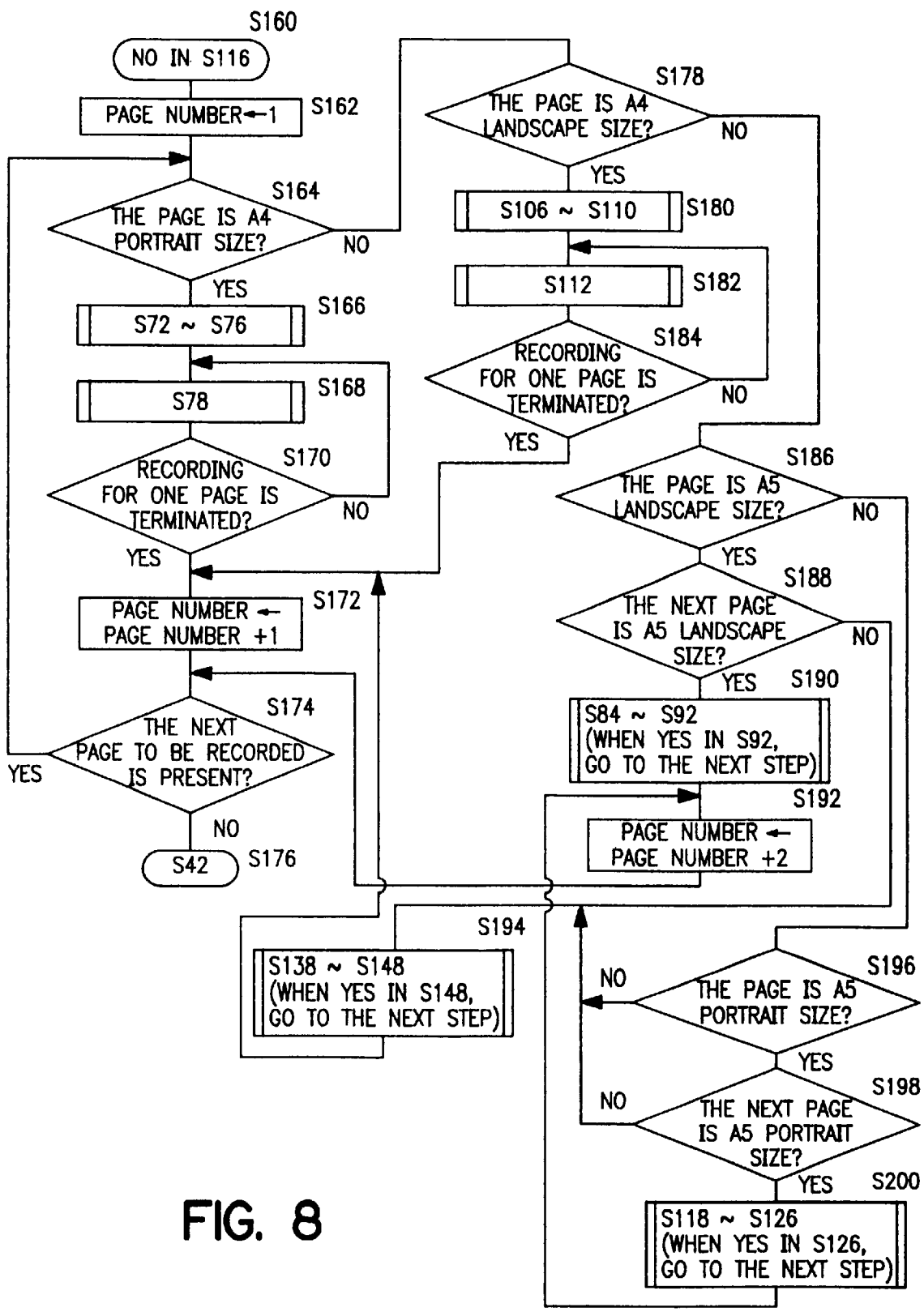

FIG. 8 is a flowchart illustrating those portions of the control of this embodiment which are different from those of FIGS. 4 to 7.

First, S160 indicates NO in the above-described step S116. In step S162, the page number of the page counter in the RAM is set at "1", and in step S164, a check is made to determine if the size and orientation of the received image information of the page stored in the page number of the page counter is A4 and portrait, respectively. If the received image information is at A4 size portrait orientation, the process proceeds to step S166. If not, the process proceeds to step S178.

Step S166 indicates the operation of the above-described steps S72 to S76, and step S168 indicates the operation of the above-described step S78 where a blank space is provided on the left end of the recording paper and recorded without length-to-width conversion.

Thereafter, when recording for one page terminates in step S170, the process proceeds to step S172 where the value of the page number of the page counter is increased by 1. Then, in step S174, a check is made to determine if received data to be recorded next is present in the memory circuit 24. When received data to be recorded next is present, the process returns to step S164 where the received data to be recorded next is processed. If, however, received data to be recorded next is not present, the process returns to step S176 (S42), and the process terminates.

In step S178, a check is made to determine if the size and orientation of the received image information of the page stored in the page number of the page counter is A4 and landscape, respectively. If the received image information is at A4 size landscape orientation, the process proceeds to step S180; if not, the process proceeds to step S186.

Step S180 indicates the operation of the above-described steps S106 to S110. Step S182 indicates the above-described step S112 where a blank space of 1 cm is provided on the right side of the recording paper, the image information is length-to-width converted and recorded. When recording for one page terminates in step S184, the process proceeds to step S172.

In step S186, a check is made to determine if the size and orientation of the received image information of the page stored in the page number of the page counter is A5 and landscape, respectively. If the received image information is at A5 size landscape orientation, the process proceeds to step S188; if not, the process proceeds to step S196.

In step S188, a check is made to determine if the size and orientation of the received image information of the page, the number of which has been added by 1, stored in the page number of the page counter is A5 and landscape, respectively. If the received image information is at A5 size landscape orientation, the process proceeds to step S190; if not, the process proceeds to step S194. When there is no next received image information of the page stored in the page number of the page counter, the process proceeds to step S194. Step S190 indicates the operation of the above-described steps S84 to S92 where a blank space of 1 cm is provided on the left end of the recording paper and information for two pages is recorded on one recording paper without length-to-width conversion. When yes in step S92, i.e., when recording for one page terminates, the process proceeds to step S192 where the page number of the page counter is added by 2 because information for two pages has been recorded.

Step S194 indicates the above-described steps S138 to S148 where a blank space of 1 cm is provided on the left side of the recording paper and the image information is recorded without length-to-width conversion. When recording for one page terminates in step S148, the process proceeds to step S172.

In step S196, a check is made to determine if the size and orientation of the received image information of the page stored in the page number of the page counter is A5 and portrait, respectively. If the received image information is at A4 size portrait orientation, the process proceeds to step S198; if not, the process proceeds to step S194.

In step S198, a check is made to determine if the size and orientation of the received image information of the page, the number of which has been added by 1, stored in the page number of the page counter is A5 and portrait, respectively, that is, if the received image information is of A5 size for two pages in succession. If the received image information is of A5 size for two pages in succession, the process proceeds to step S200; if not, the process proceeds to step S194. When there is no next received image information of the page stored in the page number of the page counter, the process proceeds to step S194.

Step S200 indicates the operations of the above-described steps S118 to S126 where a blank space of 1 cm is provided on the right side of the recording paper, the received image information is length-to-width converted and received image information for two pages is recorded on one recording paper. When yes in step S126, i.e., when recording for one page terminates, the process proceeds to step S192.

In the above-described way, it is possible to provide a most appropriate blank space on each page for mixed information and to record the information.

Third Embodiment

Although in the above-described first and second embodiments received image information is recorded on A4 size recording paper, the image information may be recorded on recording paper of other sizes. For example, the position of a blank space is made different between when A4 size image information for two pages is recorded on one page of A3 size recording paper and when A4 size image information for two pages is reduced and recorded on one page of A4 size recording paper.

Figure 9:
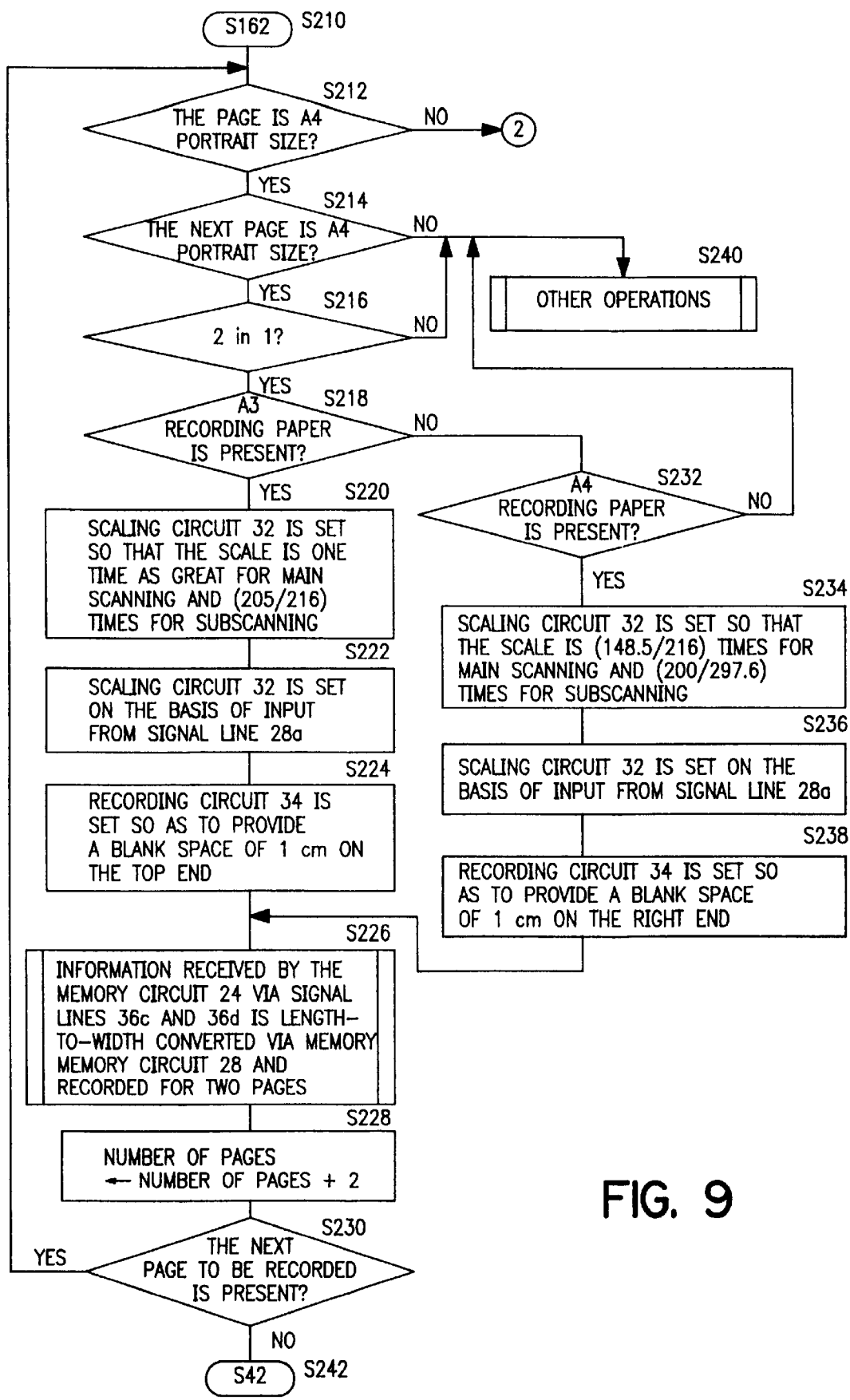
Figure 10:
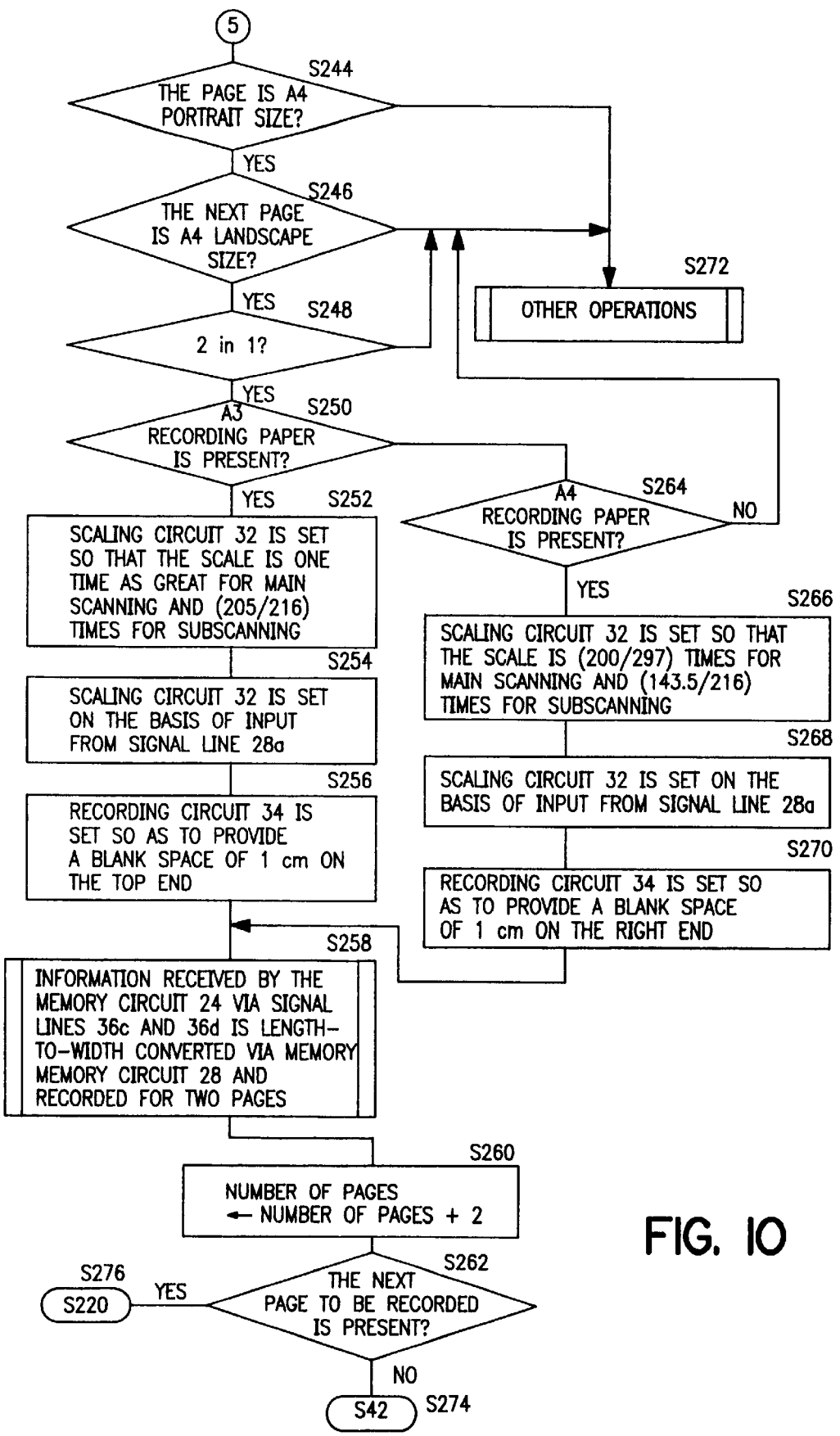

FIGS. 9 and 10 are flowcharts illustrating those portions of the control of this embodiment which are different from those of FIGS. 4 to 7.

Step S210 indicates the above-described step S162. Next, in step S212, a check is made to determine if the size and orientation of the received image information of the page stored in the page number of the page counter is A4 and portrait, respectively. If the received image information is at A4 size portrait orientation, the process proceeds to step S214; if not, the process proceeds to step S244. In step S214, a check is made to determine if the size and orientation of the received image information of the page stored in the page number of the page counter is A4 and portrait, respectively. If the received image information is at A4 size portrait orientation, the process proceeds to step S216 where a check is made to determine if received image information for two pages will be recorded on one page of recording paper. It is assumed that whether or not image information for two pages will be recorded on one page of recording paper is preset. If the received image information is not of A4 portrait size, the process proceeds to step S240 where other operations are performed.

If yes in step S216, the process proceeds to step S218; if no in step S216, the process proceeds to step S240 where other operations are performed.

In step S218, a check is made to determine if there is A3 size recording paper. If there is A3 size recording paper, the process proceeds to step S220; if not, the process proceeds to step S232. In step S220, a signal "1" is output to the signal line 36g, and a signal "205/216" is output to the signal line 36f, causing the scaling circuit 32 to be set so that the scale is one time as great for the main scanning direction and "205/216" times for the subscanning direction.

Next, in step S222, a level "0" signal is output to the signal line 36e, and the scaling circuit 32 is set to input signals from the signal line 28a. Next, in step S224, a signal "10 mm" is output to the signal line 36h, and a signal "2" is output to the signal line 36i so that the recording circuit 34 is set to provide a blank space of 1 cm on the top end of the recording paper.

In step S226, the image information received by the memory circuit 24 via the signal lines 36c and 36d is length-to-width converted via the memory circuit 28 and image information for two pages of A4 size is recorded on one page of the recording paper of A3 size with a blank space of 1 cm being provided on the top end of the recording paper. In the next step S230, the page number of the page counter is added by 2.

In step S230, a check is made to determine if received data to be recorded next is present in the memory circuit 24. If received data to be recorded next is present, the process returns to step S212, and the operation is repeated. If received data to be recorded next is not present, the process returns to step S42.

If there is no recording paper of A3 size in step S218, the process proceeds to step S232 where a check is made to determine if there is A4 size recording paper. If there is A4 size recording paper, the process proceeds to step 3234; if not, the process proceeds to step S240 where other operations are performed.

In step S234, two pages of the image information of A4 size are reduced so that the image information will be recorded on one page of recording paper of A4 size with a blank space of 1 cm being provided on the right side of the recording paper. That is, a signal "148.5/216" is output to the signal line 36g, and a signal "200/297" is output to the signal line 36f, causing the scaling circuit 32 to be set so that the scale is "148.5/216" times for the main scanning direction and "200/297" times for the subscanning direction.

Next, in step S236, a signal "0" is output to the signal line 36e, and the scaling circuit 32 is set to input signals from the signal line 28a. Next, in step S238, a signal "110 mm" is output to the signal line 36h and a signal "1" is output to the signal line 36i so that the recording circuit 34 is set to provide a blank space of 1 cm on the right side of the recording paper. Then, the process proceeds to step S226 where the image information received by the memory circuit 24 via the signal lines 36c and 36d is length-to-width converted via the memory circuit 28 and two pages of image information of A4 size are reduced and recorded on one page of the recording paper of A4 size with a blank space of 1 cm being provided on the right side of the recording paper.

In step S212, a check is made to determine if the size and orientation of the received image information of the page stored in the page number of the page counter is A4 and portrait, respectively. If the received image information is not A4 portrait size, the process proceeds to step S244 where a check is made to determine if the image information is at A4 size landscape orientation. If, however, the received image information is at A4 size landscape orientation, the process proceeds to step S246; if not, the process proceeds to step S272 where other operations are performed.

In step S246, a check is made to determine if the image information to be recorded next is also of A4 landscape size. If the image information is at A4 size landscape orientation, in step S248, a check is made to determine if it is so set that image information for two pages will be recorded on one page of recording paper. If it is so set, in step S250, a check is made to determine if there is recording paper of A3 size. If there is recording paper of A3 size, the process proceeds to step S252 where the scaling circuit 32 is set so that the scale is one time as great for the main scanning direction and "205/216" times for the subscanning direction.

In step S254, the scaling circuit 32 is set to input signals from the signal line 28a, and in step S256, the recording circuit 34 is set to provide a blank space of 1 cm on the top side of the recording paper.

Next, in step S258, the image information received by the memory circuit 24 via the signal lines 36c and 36d is not length-to-width converted via the memory circuit 28 and image information for two pages of A4 size is recorded on one page of the recording paper of A3 size with a blank space of 1 cm being provided on the top side of the recording paper.

If it is determined that there is no recording paper of A3 size in step S250, a check is made in step S264 to determine if there is recording paper of A4 size. If there is recording paper of A4 size, the process proceeds to step S266 where the image information is reduced so that the image information for two pages of A4 size is recorded on one page of the recording paper of A4 size with a blank space of 1 cm being provided on the left side of the recording paper.

Next, in step S268, the scaling circuit 32 is set to input signals from the signal line 28a. In step S270, the recording circuit 34 is set to provide a blank space of 1 cm on the left side of the recording paper, and the process proceeds to step S258.

In step S258, the image information received by the memory circuit 24 via the signal lines 36c and 36d is not length-to-width converted via the memory circuit 28 and image information for two pages of A4 size is reduced and recorded on one page of the recording paper of A4 size with a blank space of 1 cm being provided on the left side of the recording paper. The subsequent operations are the same as those described earlier, and thus an explanation thereof is omitted.

According to the third embodiment, as described above, it is possible to provide a blank space for filing purposes at the long side of A4 (297 mm) or the short side of A4 depending upon the size of the recording paper on which image information is recorded. Furthermore, it is possible to provide a blank space at an appropriate position in accordance with the image information to be recorded.

Fourth Embodiment

In the above explanation, a case in which recording paper is set vertically (the main scanning direction during recording is along the the short side of the recording paper, and the subscanning direction is along the long side thereof) has been described.

However, an image processing apparatus capable of setting recording paper in the landscape orientation, for example, A4 landscape, is known. An example in which the present invention is applied to such an apparatus will be explained below.

In this embodiment, only portions related to the recording of image information will be described, and operations, such as setting conditions, are omitted because they are the same as those described earlier.

Figure 11:
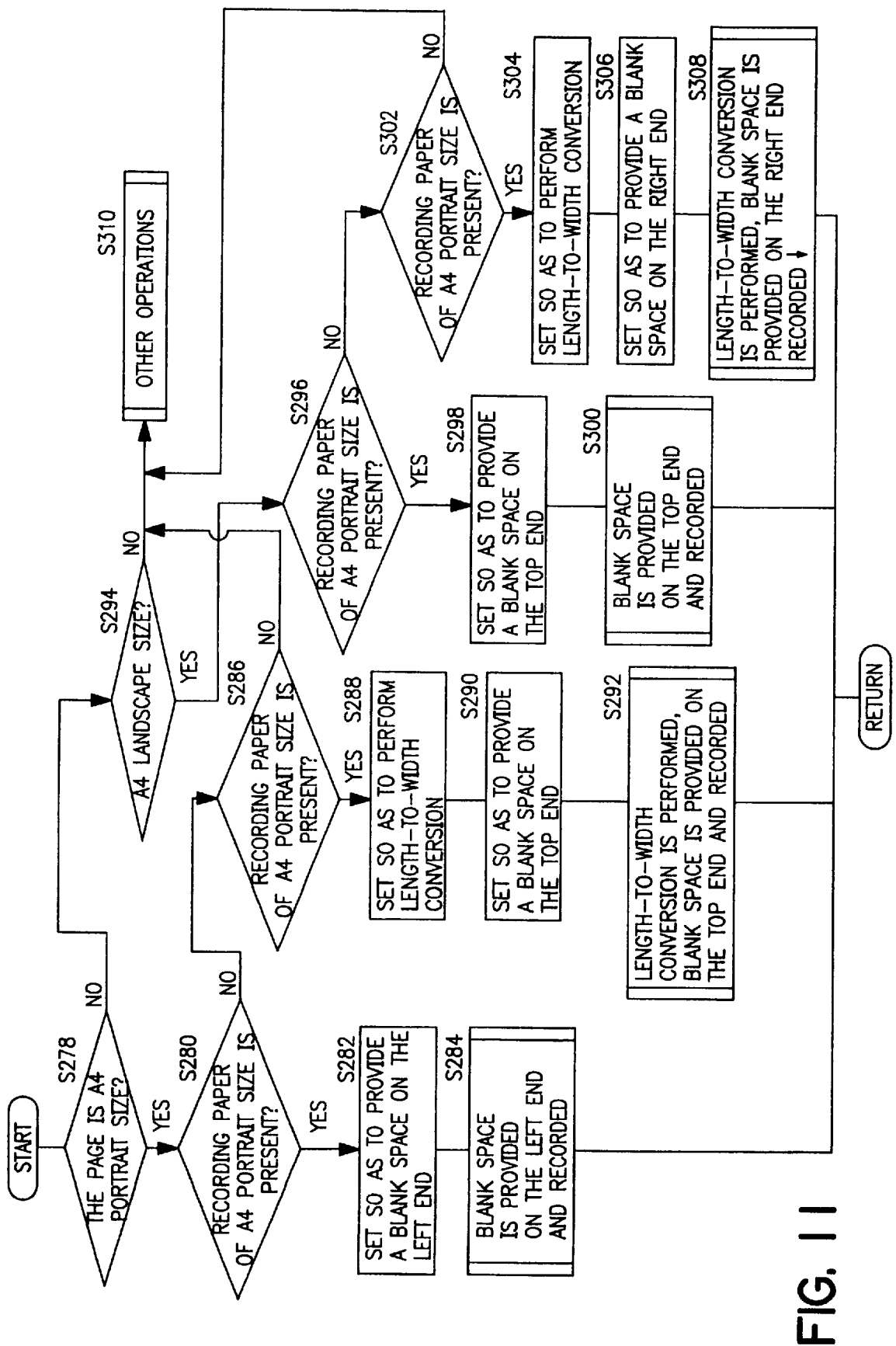

FIG. 11 is a flowchart illustrating the flow of the operation of this embodiment.

Initially, in step S278, a check is made to determine if the size and orientation of the received image information to be recorded is A4 and portrait, respectively. If the received image information is at A4 size portrait orientation, the process proceeds to step S280 where a check is made to determine if there is recording paper which is set in A4 portrait orientation.

If it is determined that there is recording paper of A4 portrait size in step S280, the process proceeds to step S282 where the scaling circuit 32 and the recording circuit 34 are set to provide a blank space of 1 cm on the left side of the recording paper. In the next step S284, the image information is recorded on recording paper which is set in A4 size portrait orientation with a blank space of 1 cm being provided on the left side of the recording paper.

If it is determined in step S280 that there is no recording paper of A4 size portrait orientation, the process proceeds to step S286 where a check is made to determine if there is recording paper of A4 size landscape orientation.

If it is determined in step S286 that there is no recording paper of A4 size landscape orientation, the process proceeds to step S288 where the length-to-width conversion circuit is set to convert the orientation of the image information. In the next step S290, the recording circuit is set to provide a blank space on the top side of the recording paper.

In the next step S292, the landscape/portrait orientation of the image information is converted, after which a blank space is provided on the top side of the recording paper and the image information is recorded on the recording paper which is set in A4 size landscape orientation.

If it is determined in step S278 that the size and orientation of image information to be recorded is not at A4 size portrait orientation, the process proceeds to step S294 where a check is made to determine if the size and orientation of image information is at A4 size landscape orientation. If the image information is at A4 size landscape orientation, the process proceeds to step S296 where a check is made to determine if there is recording paper which is set in A4 size landscape orientation.

If it is determined in step S296 that there is recording paper of A4 size landscape orientation, the process proceeds to step S298 where a blank space is provided on the top side of the recording paper. In the next step S300, a blank space is provided on the top side of the recording paper and the image information is recorded on the recording paper set in A4 size landscape orientation.

If it is determined in step S296 that there is no recording paper of A4 size landscape orientation, the process proceeds to step S302 where a check is made to determine if there is recording paper of A4 size portrait orientation.

If it is determined In step S302 that there is recording paper of A4 size portrait orientation, the process proceeds to step S304 where the length-to-width conversion circuit is set to perform length-to-width conversion on the image information. In the next step S306, the recording circuit is set to provide a blank space on the right side of the recording paper.

Next, in step S308, the landscape/portrait orientation of the image information is converted, after which a blank space is provided on the right side of the recording paper and the image information is recorded on the recording paper set in A4 size portrait orientation.

According to the fourth embodiment, as described above, it is possible to provide a blank space (the long side of A4:297 mm) of the length which is always the same regardless of the orientation of the set recording paper.

Fifth Embodiment

When, for example, two pages of image information at A4 size portrait orientation are length-to-width converted and recorded on one page of recording paper of A3 size, a blank space for filing purposes may be provided on the top and bottom ends so that the recording paper may be folded in half.

Figure 12:
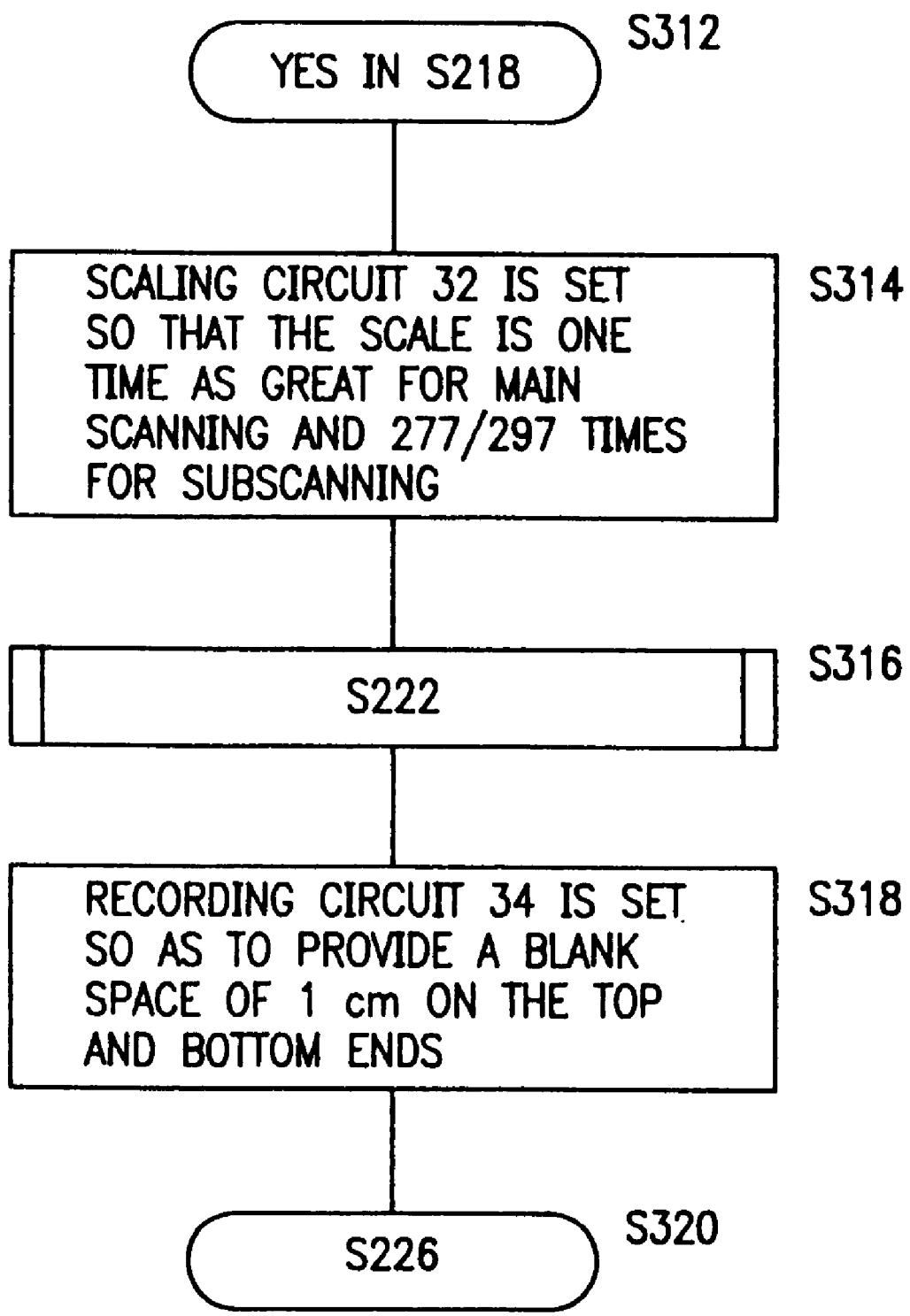

FIG. 12 is a flowchart illustrating those portions of the control of this embodiment which are different from those of FIGS. 4 to 7.

Initially, step S312 indicates yes in step S82. In step S314, a signal "1" is output to the signal line 36g, and a signal "77/297" is output to the signal line 36f, causing the scaling circuit 32 to be set so that the scale is one time as great for the main scanning direction and "11277/29711" times for the subscanning direction.

Thereafter, in step S316, the operation of the above-described step S222 is performed. Then, in step S318, a signal "10 mm" is output to the signal line 36h and a signal "4" is output to the signal line 36i so that the recording circuit 34 is set to provide a blank space of 1 cm on the top and bottom sides of the recording paper. Then, in step S320, the process proceeds to step S226 and subsequent steps.

According to the fifth embodiment, as described above, it is possible to file recording paper with a blank space being provided on both ends of the short side (corresponding to the long side of A4 size) of A3 size.

In the above-described embodiments a blank space for filing purposes is provided based on the control of the timing at which the recording starts or the timing at which the transport of the recording paper starts. However, if image information to be recorded is discriminated and white data (blank space) is added at a desired position of image information in the memory, it is possible to record the image information by merely performing normal recording with a desired blank space being provided though a large amount of memory is used.

The sizes of recording paper are not limited to the sizes described in the embodiments, but recording paper of various sizes may be used.

In a case where it is desired to unify the length of a blank space to the long side of A4 size, when image information of B4 size, for example, is input, the image information may be scaled so as to provide a blank space of the length of the long side of A4 size.

The width of a blank space is not limited to 1 cm, but a blank space of a desired width may be provided by the operator.

Although in the above-described embodiments a case in which received image information is recorded is described, the present invention is not limited to this case, but the present invention can be applied as well to a case in which image information read by the reading circuit 10 is recorded.

Although in the above-described embodiments a facsimile is used as an example, needless to say, it may be changed to a recording apparatus, such as a copying apparatus or a file apparatus.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing apparatus comprising;
   input means for inputting image data;
   processing means for processing the image data input by said input means;
   setting means for setting a blank space;

recording means for recording an image on a recording medium based on the image data processed by said processing means, with the blank space being provided as set by said setting means;

determining means for determining a size of the recording medium for recording the image by said recording means; and control means for controlling said setting means such that the blank space is set to be a predetermined length in accordance with a size of the image data input by said input means, and a position of the blank space is controlled so as to be the predetermined length in accordance with the size of the recording medium determined by said determining means.

2. An image processing apparatus according to claim 1, wherein the predetermined length is equal to about the longer side of A4 size.

3. An image processing apparatus according to claim 2, wherein said control means causes to record an image which is made of two pages of data into one page of data by said recording means in case the image data input by said input means is A5 size.

4. An image processing method comprising:

an input step of inputting image data;

a processing step of processing the image data input in said input step;

a setting step of setting a blank space;

a recording step of recording an image based on the image data processed in said processing step on a recording medium with the blank space being set in said setting step;

a determining step of determining of size of the recording medium for recording the image in said recording step; and a control step of controlling such that in said setting step the blank space is set to be a predetermined length in accordance with a size of the image data input in said input step, and a position of the blank space is controlled so as to be the predetermined length in accordance with the size of the recording medium determined by said determining step.

5. A computer readable program stored in a storage medium comprising:

an input step of inputting image data;

a processing step of processing the image data input in said input step;

a setting step of a setting a blank space;

a recording step of recording an image based on the image data processed in said processing step on a recording medium with the blank space being set in said setting step;

a determining step of determining a size of the recording medium for recording the image in said recording step; and a control step of controlling such that in said setting step the blank space is set to be a predetermined length in accordance with the size of the image data input in said input step, and a position of the blank space is controlled so as to be the predetermined length in accordance with the size of the recording medium determined by said determining step.

* * * * *

UNITED STATES PATENT AND TRADEMARK OFFICE
CERTIFICATE OF CORRECTION

PATENT NO. : 6,178,005 B1
DATED : January 23, 2001
INVENTOR(S) : Takehiro Yoshida It is certified that error appears in the above-identified patent and that said Letters Patent is hereby corrected as shown below:

Column 9,
Line 53, "Step S190" should read -- ¶ Step S190 --; and
Line 60, "added" should read -- increased --.

Column 10,
Line 9, "added" should read -- increased --.

Column 14,
Line 6, ""77/297"" should read -- "277/297" -- and ""11277/29711"" should read -- "277/297" --.

Column 16,
Line 16, "a" (2nd occurrence) should be deleted.

Signed and Sealed this

Nineteenth Day of March, 2002

Attest:

Attesting Officer

JAMES E. ROGAN
Director of the United States Patent and Trademark Office